(No Model.)

H. V. PADFIELD.
HAME FASTENER.

No. 440,054. Patented Nov. 4, 1890.

Witnesses
Ira R. Steward
Alfred T. Gage

Inventor
Harry V. Padfield
By his Attorney

UNITED STATES PATENT OFFICE.

HARRY V. PADFIELD, OF DALLAS, TEXAS.

HAME-FASTENER.

SPECIFICATION forming part of Letters Patent No. 440,054, dated November 4, 1890.

Application filed February 12, 1890. Serial No. 340,139. (No model.)

*To all whom it may concern:*

Be it known that I, HARRY V. PADFIELD, a citizen of the United States, residing at Dallas, in the county of Dallas and State of Texas, have invented certain new and useful Improvements in Hame-Fasteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to hame-fasteners, and has for its object to provide a simple and strong fastener which can be readily attached and detached to or from the hames, and easily operated to effectually lock and unlock the same.

To the accomplishment of such ends the invention consists in the construction and the combination of parts hereinafter particularly described, and then specifically defined by the claims, reference being had to the accompanying drawings, forming a part hereof, and in which—

Figure 1:
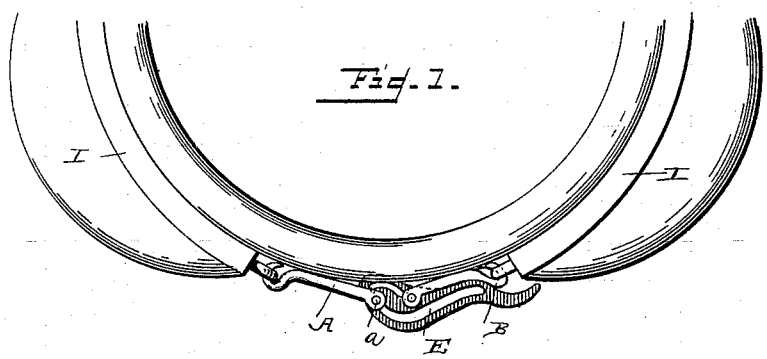
Figure 2:
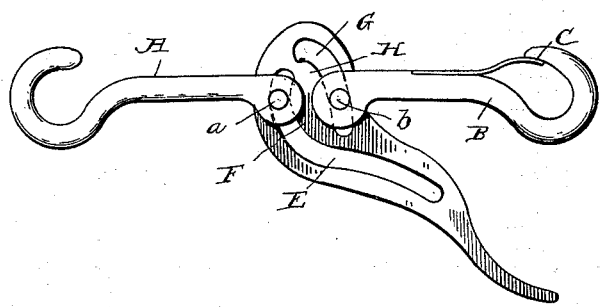
Figure 3:
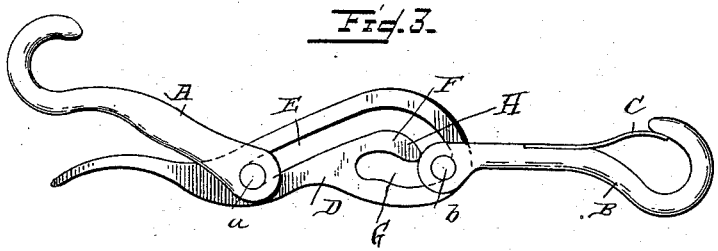

Figure 1 is a side elevation of a portion of a collar and hames with the fastener applied in a locked position to the hames. Fig. 2 is a side view of the fastener with the operating-lever extended between a locked and an unlocked position. Fig. 3 is a side view showing the several parts in an opened or unlocked position, the operating-lever having the two cam or eccentric slots opening into each other.

In the drawings, the letter A designates a hook designed to engage with the eye or loop of one hame I, and B another hook designed to engage with the other hame, while C is a spring that may be used to close the end of the hook, and which is preferably applied to only one hook, so that the other may be readily engaged with and disengaged from the hame. The two hooks are joined together by an eccentric-lever D, formed with a cam-slot E, in which will fit the pivot-pin $a$ of the hook A, so that as the lever is thrown into the position shown in Fig. 3 the fastenings will be distended and the hames unlocked, and when thrown into the position shown in Fig. 1 the lever will have moved to bring the pivot-pin $a$ of the hook to the other extremity of the cam-slot beyond the cam or eccentric F, and the parts be thus drawn together and locked by the pin lying beyond the eccentric F.

The hook B has its pivot-pin $b$, lying back from the inner end of the eccentric-lever and under the eccentrics F, as shown in Figs. 2 and 3. By locating the pin, as shown, and forming the eccentric as illustrated, a better leverage and easier working of the parts are obtained.

The preferred form of lever is that illustrated in Fig. 3, where the second cam-slot G, in which fits the pin $b$ of the hook B, is made to open into the longer cam-slot. This slot also forms a cam or eccentric H, as shown. These slots allow the two hooks to be separated farther than they could be if the pin be stationary. In all cases, however, the pin of the hook B is at a point back from the inner end of the eccentric-lever, with the eccentric F opposite to it, as shown.

The line of curve of the slots E and G may be somewhat changed—for instance, as illustrated—without departing from the essentials of the invention.

The device is composed of only three parts—two hooks and an eccentric operating-lever—and they are simple, strong, and not liable to get out of order. The device is also adapted to be applied and used by the most unskillful.

Having described my invention and set forth its merits, what I claim is—

1. In a hame-fastener, the combination, with the eccentric-lever D, formed with the two slots E and G, one of which forms the cam F, of the hook A, secured and movable within the slot E by the pivot-pin $a$, and the hook B, secured and movable within the slot G by the pivot-pin $b$, substantially as and for the purposes set forth.

2. In a hame-fastener, the combination, with the eccentric-lever D, formed with two slots E and G communicating with each other, and one of which forms the cam F, of the hook A, secured and movable within the slot E by the pin $a$, and the hook B, secured and movable within the slot G by the pivot $b$, substantially as and for the purposes set forth.

In testimony whereof I affix my signature in presence of two witnesses.

HARRY V. PADFIELD.

Witnesses:
 JNO. B. KUNZ,
 E. A. PADFIELD.